C. C. POST.
Sap-Spouts.
No. 5,175. Reissued Dec. 3, 1872.
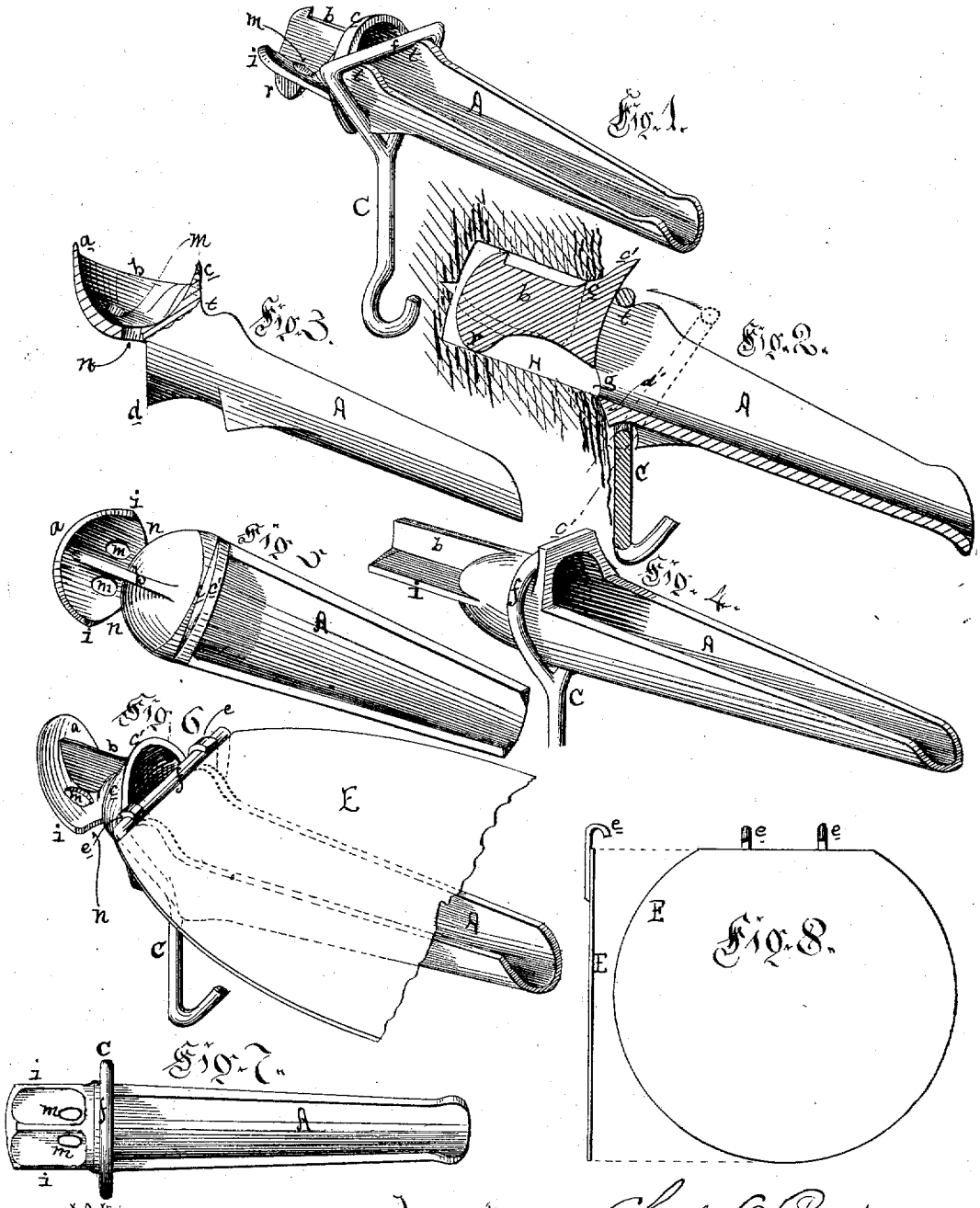
Witnesses
J. C. Lyons
Geo Barth
Inventor
Charles C. Post
By his atty
R. D. Smith
AM. PHOTO-LITHOGRAPHIC CO. N.Y. (OSBORNE'S PROCESS.)

UNITED STATES PATENT OFFICE.

CHARLES C. POST, OF BURLINGTON, VERMONT.

IMPROVEMENT IN SAP-SPOUTS.

Specification forming part of Letters Patent No. 117,326, dated July 25, 1871; reissue No. 5,175, dated December 3, 1872.

*To all whom it may concern:*

Be it known that I, CHARLES C. POST, of Burlington, in the county of Chittenden and State of Vermont, (late of Hinesburg, in same State,) have invented a new and useful Improvement in Metallic Sap-Spouts, Bucket Hangers and Covers combined; and I do hereby declare the following to be a full, clear, and exact description of the same, reference being had to the accompanying drawing, in which—

Figure 1 is a perspective view of my sap-spout with bucket-hanger attached; Fig. 2 is a vertical longitudinal section of the same, inserted in the top; Figs. 3, 4, 5, and 7 represent modified constructions of the lips for fastening to the tree; Fig. 6 represents my sap-spout with bucket-hanger and cover attached; and Fig. 8 is a plan and edge view of my bucket-cover.

My invention relates to the non-corrosive metallic sap-spout patented to me November 24, 1868; and this improvement consists in the several modifications of the form of the lips or fastenings to secure the metallic spouts to the trees; also, in combining with the spout the detachable metallic hook or bucket hanger; and likewise the detachable lid or bucket-cover.

That others may fully understand my several improvements I will particularly describe them.

The spout A, as shown in Figs. 3 and 6, is provided with a bent-up cup-shaped lip, *a*, which is strengthened by a thin rib, *b*, on the upper side, connecting said lip with a rim or flange, *c*, transverse to and above the upper portion of the spout; said rim, with *d* across the under portion, is so formed as to compress the bark around the bore and prevent any leakage or waste of the sap. The bucket is supported in notches *t* on the top of the spout, so that the weight of the bucket, resting upon the spout outside of the shoulders *c d*, operates to maintain the pressure of the shoulder *d* against the bark and thereby prevent leakage, but also to force the lip *a* upward against the tap at its inner end, and thus render the hold of the lips more firm. The hook or bucket-hanger C is formed with a loop or ring, *f*, at its upper end to encircle the spout and rest in the notches on the top thereof. The loop or ring may be triangular in form to admit the hooks *e* by which the lid or cover E is attached. The cover E is attached to the spout instead of being attached to the bucket, so that both spout and bucket are protected from rain by the same cover. I employ a detachable hanger to sustain the bucket, not only because the hanger and spout may be more economically manufactured separately, but also because the loss of the one will not disable the other; if either should be absent the other would be still serviceable. When the detachable hanger is used, it is necessary that it should be so confined by the spout when the inner end of the latter is driven into the tree that said hanger cannot become detached, nor even sway about to any considerable extent. The upper part of the spout is, therefore, constructed with notches or lugs projecting upward, and with lugs or projecting shoulders on the lower surface, behind which the loop of the hanger is confined. The loop of the hanger C may be attached by slipping it over the end of the spout and then over the lower shoulders first, in the position shown by dotted lines in Fig. 2. The loop may then be passed over the upper lugs by the swinging movement shown by the arrow in the same figure. When, thereafter, the inner end of the spout is driven into the tap the loop of the hanger will be confined by said notches and shoulders and the surface of the tree, and be incapable of removal. To secure the greatest flow of sap from one tap it is not only necessary that the air should be entirely excluded from the tap, and also that the sap should be entirely drained away as fast as it exudes from the pores of the wood; otherwise it is liable to become sour and thereby induce fermentation. I therefore make but one orifice for the escape of the sap into the spout, viz., at *g*, and I construct the inner end of the spout with an oblique shoulder in the manner shown at *d'*, Fig. 2, to compress the bark immediately beneath the tap and thereby prevent leakage, and so that said orifice may be as nearly as possible in line with the lowest portion of the tap H. The orifice *g* is made of small size, so that the smallest flow will keep it always full—that is to say, capillary action will cause the said orifice to be filled by the sap so long as a single drop thereof is present. To secure complete drainage the tap is bored into the tree with an upward inclination, as shown in Fig. 2. The lateral fins *i* bite into the wood on each side of the tap, and thereby divide the same into two compartments.

For the reasons above set forth it is not desirable to permit the escape of sap from the upper of said compartments directly to the spout; and I therefore construct said fins with notches *n* or perforations *m*, to permit the sap to flow freely to the lower chamber or compartment, whence it may escape through the orifice *g* into the spout. It is of the greatest importance that the spout, when once inserted, shall not be displaced by any accidental blow which it is likely to receive, as when the filled bucket is being removed or an empty one placed. If the inner end is not firmly seated a blow received in that way would cause a leakage of the sap. Such blows are more liable to come from below, and neither the fin *b* nor the lateral fins *i i* are in effective position to resist. It is not desirable to place a fin along the bottom, as that would interfere with the free escape of the sap; and I therefore place a stud, *r*, projecting downward from the extreme inner end of the spout, and said stud will rest against the bottom of the tap at its extreme inner end, and effectually counteract any slight force tending to elevate the outer end of the spout without obstructing the flow of the sap to and through the orifice *g*.

When it rains, water, discolored by matters from the bark, trickles down upon the sap-spout, and, if not prevented, will enter the spout and run down with the sap, not only diluting it, but injuring it by the impurities carried down with it. To guard against this contamination I extend the oblique shoulder *c* upward above the upper side of the spout, as shown particularly at *c'*, in Figs. 2 and 4, far enough to form a channel between said shoulder and the bark of the tree to receive and conduct away the impure water referred to. The spouts so constructed can be inserted in the trees sufficiently tight and will hold the sap from leakage without being driven in; and when the season is over said spouts can be taken out easily without breaking or damage to the tree, and they may be kept in good condition and used successively year after year for a lifetime.

Having described my invention, what I claim as new is—

1. A metallic sap-spout provided with lips or catches *a i*, as shown, for the purpose of holding firmly into the tree, substantially as specified.

2. The combination of the hinged cover E with the hook C and the spout A, as above specified.

3. The detachable bucket-hanger C in combination with a metallic sap-spout, as described.

4. The detachable hanger C in combination with a metallic sap-spout provided with notches *t* on the upper part and the lugs or projecting shoulders on the lower part, substantially as and for the purpose set forth.

5. A sap-spout constructed with an oblique shoulder, *d'*, extending around the under portion of its inner end, and a single small orifice, *g*, located in the manner and for the purpose set forth.

6. The fins or catches *a i* notched or perforated, substantially as and for the purpose set forth.

7. In combination with the holding-fins or catches *i*, the stud *r*, to rest against the bottom of the tap at its inner end, as and for the purpose set forth.

8. In an open sap-spout, the oblique shoulder *c'*, prolonged upward and around the upper portion of said spout to form a water-guard, as set forth.

CHARLES C. POST.

Witnesses:
R. D. O. SMITH,
GEO. BARTLE.